(Model.)
2 Sheets—Sheet 1.
M. VAN ENSLEY.
BEE HIVE.
No. 264,376.
Patented Sept. 12, 1882.
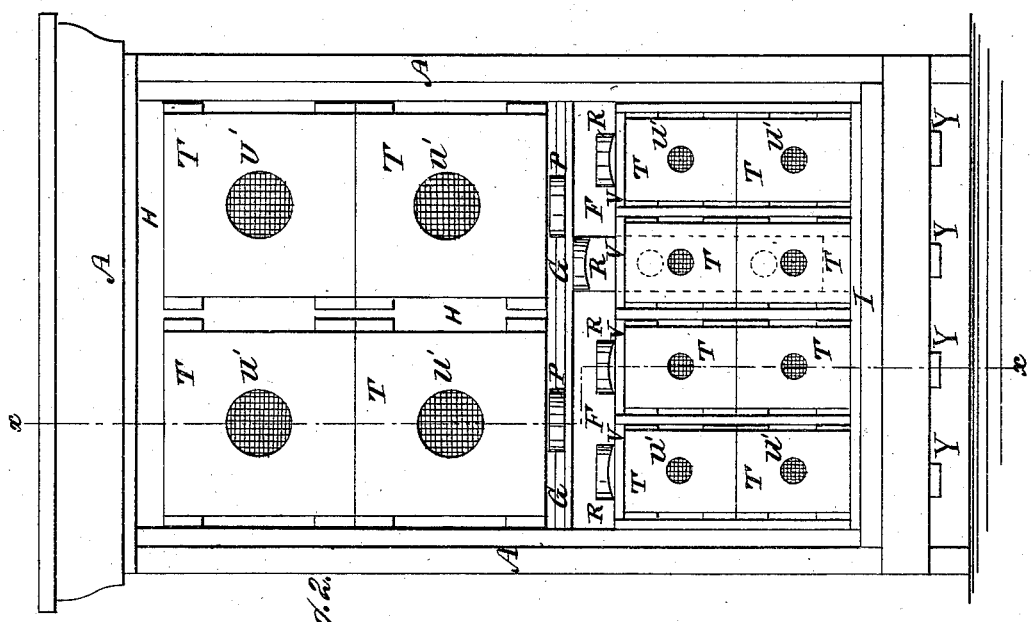
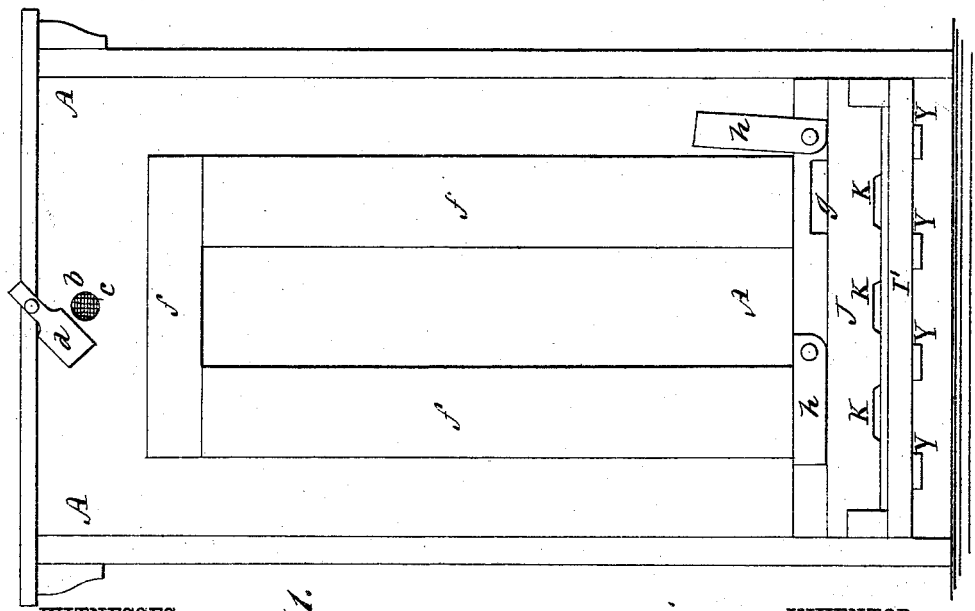
WITNESSES:
INVENTOR:
M. Van Ensley
BY Munn & Co
ATTORNEYS.

(Model.)
M. VAN ENSLEY.
BEE HIVE.
No. 264,376.
2 Sheets—Sheet 2.
Patented Sept. 12, 1882.
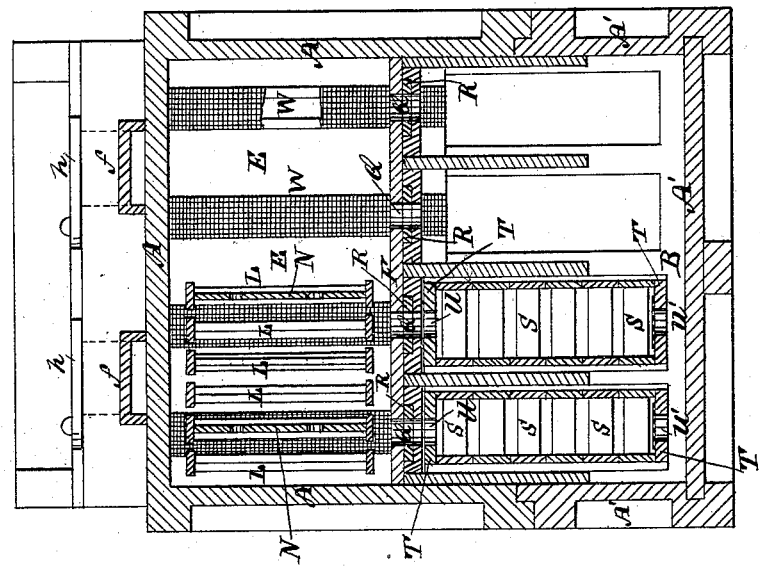
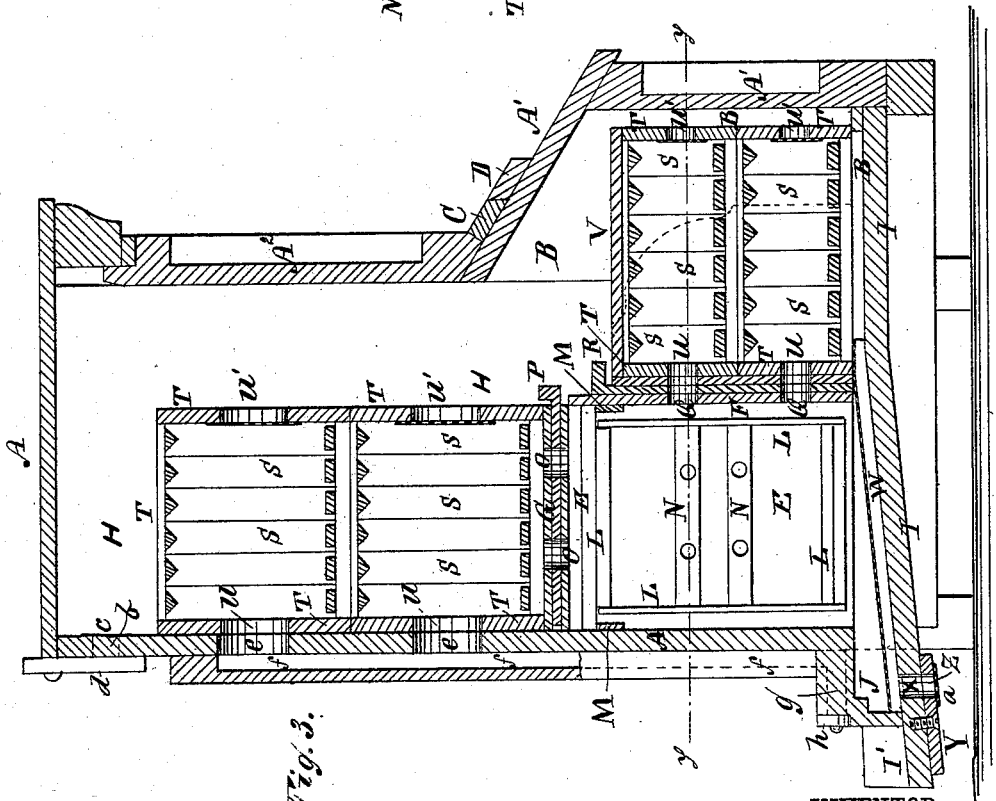
WITNESSES:
Theo. G. Hoster
C. Sedgwick
INVENTOR:
M. Van Ensley
BY Munn & Co
ATTORNEYS.

UNITED STATES PATENT OFFICE.

MARTIN VAN ENSLEY, OF McMINNVILLE, OREGON.

BEE-HIVE.

SPECIFICATION forming part of Letters Patent No. 264,376, dated September 12, 1882.

Application filed January 27, 1882. (Model.)

*To all whom it may concern:*

Be it known that I, MARTIN VAN ENSLEY, of McMinnville, in the county of Yam Hill and State of Oregon, have invented certain new and useful Improvements in Bee-Hives, of which the following is a full, clear, and exact description.

Reference is to be had to the accompanying drawings, forming part of this specification, in which similar letters of reference indicate corresponding parts in all the figures.

Figure 1, Sheet 1, is a rear elevation of my improvement. Fig. 2, Sheet 1, is a front elevation of the same, the front wall of the hive being removed. Fig. 3, Sheet 2, is a sectional side elevation of the same, taken through the plane of the line $x\,x$, Fig. 2. Fig. 4, Sheet 2, is a sectional plan view of the same, taken through the line $y\,y$, Fig. 3.

The object of this invention is to promote convenience in the care of bees.

A represents the shell or casing of the hive, upon the lower part of the front of which is formed an extension to form a honey-chamber, B. The lower extension part, A', of the front of the shell A and the upper part, A², are detachable, and are secured in place by a wedge-key, C, inserted between the lower end of the upper part, A², of the hive-front and the tapered cleat D, attached to the inclined top of the lower part, A', of the said front.

In the lower part of the main hive is formed the brood-chamber E, which is separated from the surplus-honey chamber B by a vertical partition or honey-board, F. The brood-chamber E is separated from the upper part of the main hive by a partition or top honey-board, G, so that the upper part of the hive can be used as a surplus-honey chamber, H. The part of the bottom I beneath the brood-chamber E inclines downward and rearward, as shown in Fig. 3, and projects at the rear side of the hive to form a platform, I', for the bees to alight upon and take flight from.

Between the lower edge of the rear side of the shell A and the inclined bottom I is formed a chamber, J, which is designed to project through the wall of the building in which the hive is placed, and in the lower edge of the outer wall of which are formed openings K, as shown in Fig. 1, through which the bees enter and leave the hive.

L are the comb-frames of the brood-chamber, which are made square. They are placed with an angle downward, and are halved at their ends to form shoulders to receive the upper ends of the side bars of the said frames. The halved ends of the top bars of the frames L project so as to rest upon cleats M, attached to the rear side of the hive and the front partition or honey-board, F. Sufficient space is left between the frames L and the sides and top of the brood-chamber E to allow the bees to pass around the said frames freely.

To the middle parts of the side bars of the frames L are attached the ends of cross-bars N, to give additional support to the combs and prevent the bees from connecting the frames with comb. Through the cross-bars N are formed holes to allow the bees and the queen to pass freely from frame to frame.

The top partition or honey-board, G, is made double, and has one or more holes, O, formed through it for the passage of the bees between the brood-chamber E and the surplus-honey chamber H. The adjacent sides of the parts of the honey-board G are grooved to form sockets to receive the slides P, which have holes formed through them corresponding in shape and size with the holes through the said honey-board G, and in such a position that the holes O will be closed when the slides P are drawn out and open when the said slides are pushed in.

The front honey-board, F, has holes Q formed through it for the passage of the bees between the brood-chamber E and the surplus-honey chamber B. The honey-board F is made double, and has the adjacent sides of its parts grooved to form sockets to receive the slides R, or has boards attached to its outer side and grooved upon their inner sides to receive the said slides R. The slides R have holes formed through them corresponding in shape and sizes with the holes Q, and in such a position that the holes Q will be closed when the slides R are drawn upward and will be opened when the slides R are pushed downward.

The comb-frames S for the surplus-honey chambers are arranged in tiers, and the frames of each row are inclosed in a crate, T, formed of two end boards connected by bars at the upper and lower parts of their side edges. The end boards of the crates T have holes U U' formed through them for the passage of air, the holes U in the inner ends of the top crates serving also for the bees to pass out through when the holes O in the honey-board G are closed. The holes U' in the outer ends of the crates T are covered with wire-gauze, to prevent the bees from passing through them. The top and bottom bars of the comb-frames S in the surplus-honey chambers B H are made so much narrower than the side bars that the bees can pass through all the frames of the crates that are placed in the same vertical row. The bees are prevented from passing out at the tops of the upper rows of comb-frames by honey-boards V, laid upon the said tops.

From the lower part of the surplus-honey chamber B, below each lowest crate, T, a passage, W, leads through the lower part of the honey-board F and along the bottom I of the hive. The passages W, through the brood-chamber E, are formed by attaching cleats to the bottom I and attaching wire-gauze to the upper sides of the said cleats.

At the lower end of each passage W a hole, X, leads down through the bottom I.

To the lower side of the bottom I, at the sides of the holes X, are pivoted the centers of buttons Y in such positions that either end of the said buttons can be turned over the said holes X. One end of each button Y is solid, and its other end has a hole, Z, formed through it and covered with wire-gauze $a$. The buttons Y, thus constructed, can be turned to leave the holes X unobstructed, to closely cover the said holes, so that nothing can enter them, or to cover the said holes with wire-gauze, so that air can enter them, but nothing else. The passages W thus serve as ventilators to admit air to ventilate the hive.

The heated air can be allowed to escape through a hole, $b$, in the upper part of the rear side of the hive A, which is covered with wire-gauze $c$, and can be closed, when desired, by a button, $d$, pivoted to the said rear side of the hive.

In the rear side of the hive A, and directly opposite the holes in the inner ends of the crates T in the upper surplus-honey chamber, H, are formed holes $e$, opening into shallow boxes $f$, attached to the rear side of the shell A. The lower ends of the boxes $f$ open into passages $g$ in the top wall of the entrance-chamber J, and which are closed by buttons or gates $h$, pivoted or sliding in a rabbet in the said top wall of the entrance-chamber J.

With this construction, when honey is to be removed from the front surplus-honey chamber, the slide or slides R are adjusted to close the holes through the honey-board F, and the buttons Y are adjusted to leave the outer ends of the passages W X unobstructed. With this arrangement bees cannot enter the comb-frames S from the brood-chamber E, and the bees within the said frames will pass out through the passages W X, so that the honey can be removed without disturbing the bees. When the honey is to be removed from the upper surplus-honey chamber, H, the slides P are drawn out to close the holes O in the honey-board G and prevent the bees from entering the honey-frames S from the brood-chamber E, and the buttons or gates $h$ are turned to open the lower ends of the passages $f\,g$, so that the bees in the comb-frames S will pass out through the passages $f\,g$, and the honey can be removed without disturbing the bees.

Having thus fully described my invention, I claim as new and desire to secure by Letters Patent—

1. In a bee-hive, the passages $f\,g$, leading from the upper surplus-honey chamber, H, to the lower part of the rear side of the hive, and provided with gates $h$ at their lower ends, substantially as herein shown and described, whereby the bees can escape from the said chamber when the inlet-passages are closed, as set forth.

2. In a bee-hive, the passages W X, leading from the front surplus-honey chamber, B, along the floor I, covered with wire-gauze, and provided at their outer ends with closing-buttons Y, substantially as herein shown and described, whereby the bees can escape from the said chamber when the inlet-passages are closed and air can be admitted to ventilate the hive, as set forth.

3. In a bee-hive, the comb-frame crates T, made with an unobstructed aperture in their inner ends for the passage of bees and a gauze-covered aperture in their outer ends for the passage of air, substantially as herein shown and described.

4. In a bee-hive, the combination, with the separable parts A' A² of the front of the hive, of the stationary cleat D and the wedge-key C, substantially as herein shown and described, whereby the said parts are locked together and in place, as set forth.

MARTIN VAN ENSLEY.

Witnesses:
ALBERT D. SIMPSON,
WOODFORD P. HOLMAN.